(12) United States Patent
Ikeda et al.

(10) Patent No.: US 6,788,296 B2
(45) Date of Patent: Sep. 7, 2004

(54) COORDINATE DATA ENTRY DEVICE

(75) Inventors: Masaki Ikeda, Kumamoto (JP); Katsu Tasaki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 10/167,736

(22) Filed: Jun. 11, 2002

(65) Prior Publication Data

US 2003/0014138 A1 Jan. 16, 2003

(30) Foreign Application Priority Data

Jun. 13, 2001 (JP) ........................................ 2001-178106

(51) Int. Cl.[7] .............................................. G09G 5/00
(52) U.S. Cl. .................. 345/177; 178/18.04; 178/20.04
(58) Field of Search .............................. 345/173, 177, 345/178; 178/18.01, 18.02, 18.03, 18.04, 20.01, 20.03, 20.04

(56) References Cited

U.S. PATENT DOCUMENTS

| | | | | |
|---|---|---|---|---|
| 4,777,329 A | * | 10/1988 | Mallicoat .................. 178/19.02 |
| 4,902,858 A | * | 2/1990 | Yamanami et al. ....... 178/18.07 |
| 5,717,168 A | * | 2/1998 | DeBuisser et al. ........ 178/18.04 |
| 5,768,616 A | * | 6/1998 | Teterwak ........................ 710/5 |
| 6,184,873 B1 | * | 2/2001 | Ward et al. .................. 345/179 |

* cited by examiner

*Primary Examiner*—Kent Chang
(74) *Attorney, Agent, or Firm*—RatnerPrestia

(57) ABSTRACT

The present invention provides a coordinate data entry device comprising a plurality of receivers disposed in the vicinity of a board surface, and a position indicator to transmit signals, at least one of which employs ultrasonic waves, to the receivers, thereby detecting the position of the position indicator on the board surface and making the coordinate position thereof available for entry, in which the signal employing ultrasonic waves is transmitted at an arbitrary time interval, and an ultrasonic oscillating circuit transmitting the signal employing ultrasonic waves comprises a resonant circuit formed of an ultrasonic resonator and a coil, which are connected in parallel with each other, and the amplitude of a start current of the ultrasonic resonant circuit is made variable according to the lapse of time, thus allowing the variations in performance of the resonant circuit including the ultrasonic resonator to be smoothed out and making stabilized positional detection possible.

7 Claims, 6 Drawing Sheets

Input

Output
(Voltage applied to ultrasonic resonator)

Waveforms when propagated in the air

Waveforms received by sensor

Threshold level of comparator

COORDINATE DATA ENTRY DEVICE

FIELD OF THE INVENTION

The present invention relates to a coordinate data entry device for entering data of a position indicator on a board surface by the use of a surface entry type acoustic coordinate data entry technology utilizing ultrasonic waves. (The foregoing "coordinate data entry technology" is referred to as a "digitizing technology", wherever appropriate, hereafter.)

BACKGROUND OF THE INVENTION

In recent years, a greater use of a digitizer has been prevailing in picking up coordinate data by pointing a position indicator at a design drawing posted on a drawing board, thereby allowing the coordinate data of the design drawing to be processed for input to a personal computer (referred to as PC, hereafter). A position indicator is provided with the function of transmitting ultrasonic waves and the transmitted ultrasonic waves are received by the receivers installed on the upper edge of the drawing board at both ends thereof, thereby allowing the point positions of the position indicator on the drawing board to be transmitted to PC for transforming the positional information to data.

FIG. 4 is a schematic illustration of a prior art coordinate data entry device, FIG. 5 is a schematic circuit diagram of an ultrasonic oscillating circuit used in a prior art coordinate data entry device, FIG. 6 shows signal waveforms of a prior art coordinate data entry device and FIG.7 illustrates how the erroneous performance of a prior art coordinate data entry device is caused by reflective waves.

The coordinate data entry device of FIG. 4 comprises position indicator 7 to transmit ultrasonic waves intermittently and receivers 6 mounted on the upper edge of drawing board 5 at the right and left ends thereof. Receiver 6 measures a propagation period of time required of the ultrasonic waves from position indicator 7 to reach receiver 6 and converts the measured propagation period of time to a corresponding distance, finds out the coordinate of position indicator 7 according to a triangulation technique and transmits the positional information to PC 8. For an accurate time measurement, position indicator 7 and receiver 6 are synchronously operated all the time and, upon transmitting ultrasonic waves from position indicator 7, receiver 6 starts a time measurement in synchronization with position indicator 7, thereby enabling the measurement of propagation time to be carried out accurately.

With the coordinate data entry device having the foregoing structure, the positional information of position indicator 7 is displayed instantaneously on the display screen of PC 8 and the plotting information on drawing board 5 is allowed to be entered in PC 8.

Next, a reference is made to a prior art ultrasonic oscillating circuit that is built in position indicator 7 of the aforementioned coordinate data entry device. FIG. 5 and FIG. 6 show a schematic circuit diagram and signal waveforms of the ultrasonic oscillating circuit, respectively. As FIG. 5 shows, the ultrasonic oscillating circuit comprises transistor 1, ultrasonic resonator 4 and pulse transformer 9. When a pulse of FIG. 6A is fed to transistor 1, an electric current flows in the primary winding of pulse transformer 9, thereby causing a stepped up voltage to be generated in the secondary winding. When the pulse application ceases thereafter, a damped oscillation with the stepped up voltage serving as the reference voltage starts in the resonant circuit formed of the secondary winding of pulse transformer 9 and ultrasonic resonator 4 and an output voltage having the waveforms as shown in FIG. 6B is applied to ultrasonic resonator 4, resulting in generation of ultrasonic waves.

However, with the coordinate data entry device of FIG. 5, even if the pulse fed to transistor 1 remains the same in magnitude, variations in the level of generated ultrasonic waves are unavoidable because of the variations involved with the performance of the power supply and pulse transformer and also the output of the ultrasonic resonator.

As FIG. 5 shows, a damped oscillation voltage is applied to the ultrasonic resonator contained in a position indicator and the ultrasonic waves actually propagated in the air exhibit the waveforms with the amplitude thereof increased and then attenuated gradually. (See FIG. 6C) In addition, since a resonance type ultrasonic sensor is in general used in receiver 6, the received waveforms show a gradual increase in amplitude and then a trailing amplitude attenuation after passing the maximum amplitude as FIG. 6D shows. Generally, in order to minimize the amount of deviation in positional detection, receiver 6 for receiving ultrasonic waves is arranged to detect the level of a waveform after a few waveforms are passed since the start of receiving the ultrasonic waves by means of a comparator, the threshold level of which is set up at the aforementioned level, thereby allowing the period of time between the start of ultrasonic waves transmission and the arrival of ultrasonic waves at receiver 6 to be measured. In this case, a variation of oscillating ultrasonic waves in level ends up with causing the detection position to shift erroneously. When the detection position shifts by one wave (one wavelength), the frequency of the ultrasonic waves is 40 KHz and the velocity of sound is 340 m/s, the error involved with the distance measurement value turns out as large as 8.5 mm.

Further, as FIG. 6D shows, the ultrasonic waves reach the maximum amplitude at a position behind the detection position due to a resonance phenomenon and, when the driving of the ultrasonic resonator is performed intermittently with these waveforms, the reflective waves received with delay cause a problem. A description is given to this problem with reference to FIG. 7. The upper diagram of FIG. 7 shows the ultrasonic waveforms of an intermittent oscillation while the lower diagram of FIG. 7 shows the waveforms of received ultrasonic waves. When the ultrasonic waves are received, receiver 6 receives both the direct waves that arrive at receiver 6 via the shortest possible distance and the reflective waves that are attenuated and delayed due to bouncing off an object.

As FIG. 7 shows, when the reflective waves are received after the next oscillation waves and the maximum amplitude thereof exceeds the threshold level of the comparator, the propagation period of time of the ultrasonic waves is t' instead of t, thereby making the propagation period of time shorter and allowing the step of positional detection to be performed erroneously.

SUMMARY OF THE INVENTION

The present invention provides a coordinate data entry device comprising:

a plurality of receivers disposed in the vicinity of a board surface; and a position indicator to transmit signals, at least one of which employs ultrasonic waves, to the receivers, thereby detecting the position thereof on the board surface and making the coordinate position thereof available for entry, in which the signal employing ultrasonic waves is transmitted at an arbitrary time interval from an ultrasonic oscillating circuit comprising a resonant circuit formed of an ultrasonic resonator and a coil, which are connected in parallel with each other, and the magnitude of an electric current, which starts the operation of the resonant circuit, to vary according to the lapse of time.

DESCRIPTION OF THE PREFERRED EMBODIMENTS

Figure 1:
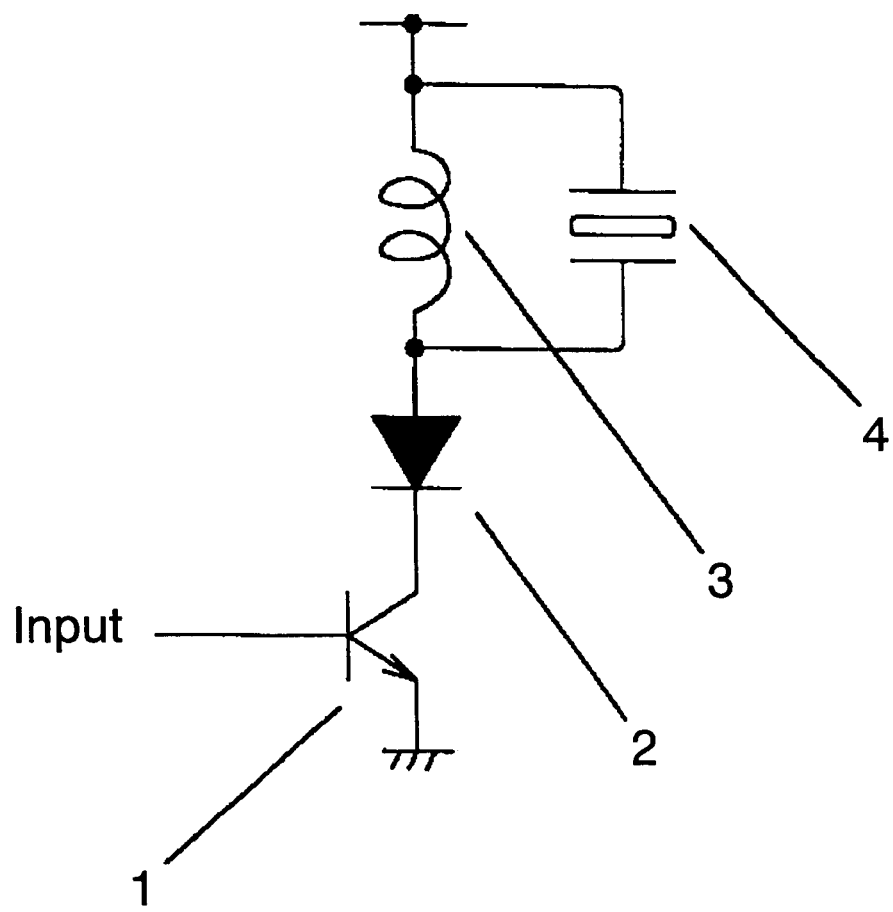
FIG. 1 is a schematic circuit diagram of an ultrasonic oscillating circuit for a coordinate data entry device in exemplary embodiment 1 of the present invention.

Next, a description is given to the preferred embodiments of the present invention with reference to FIG. 1 through FIG. 3.

(Exemplary Embodiment 1)

Figure 2A:
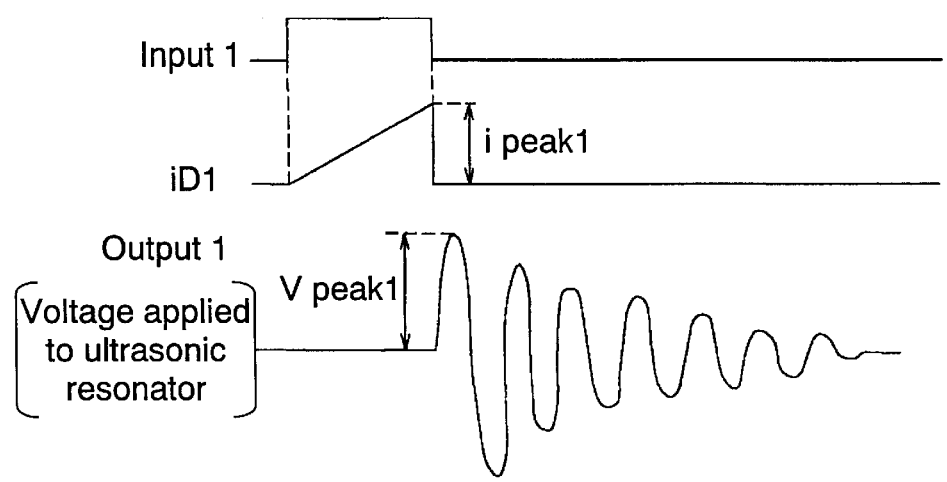
FIG. 2A and FIG. 2B illustrates how an ultrasonic oscillating circuit for a coordinate data entry device in exemplary embodiment 1 of the present invention operates, respectively.
Figure 2B:
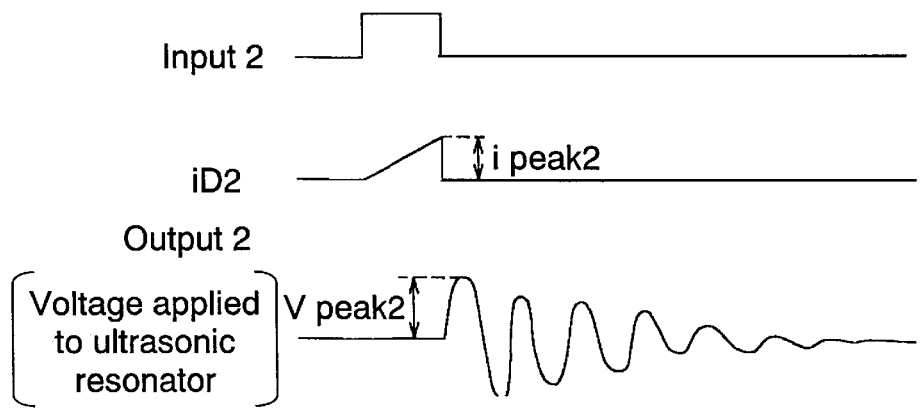
Figure 4:
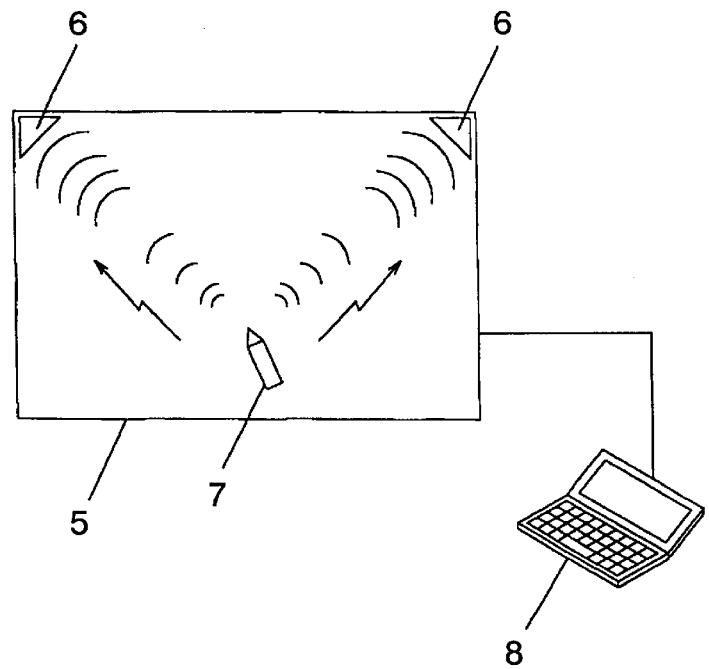
FIG. 4 is a schematic illustration of a prior art coordinate data entry device.
Figure 5:
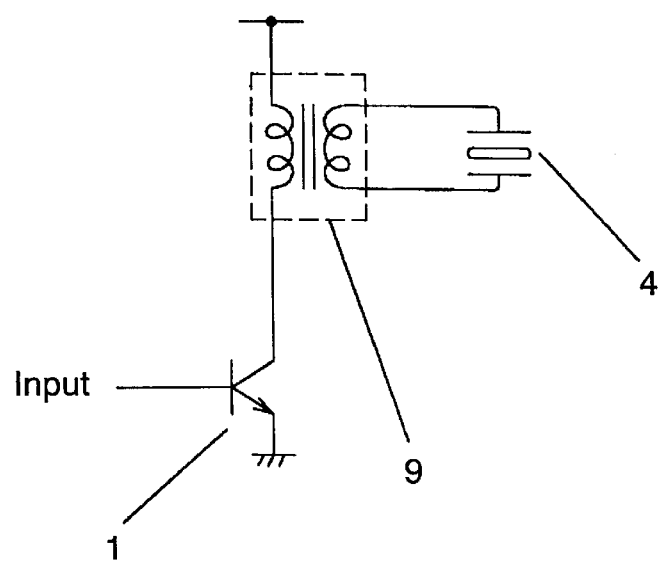
FIG. 5 is a schematic circuit diagram of an ultrasonic oscillating circuit for a prior art coordinate data entry device.
Figure 6A:
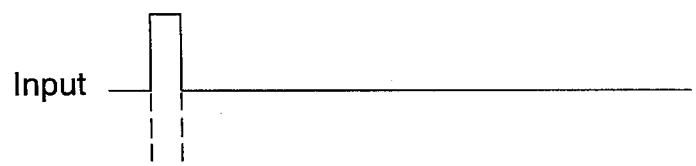
FIG. 6A, FIG. 6B, FIG. 6C and FIG. 6D shows signal waveforms of a prior art coordinate data entry device, respectively.
Figure 6B:
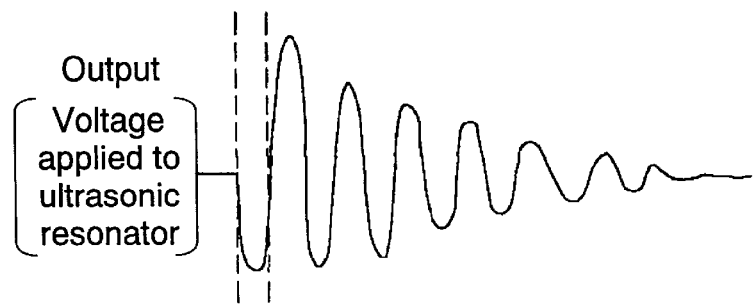
Figure 6C:
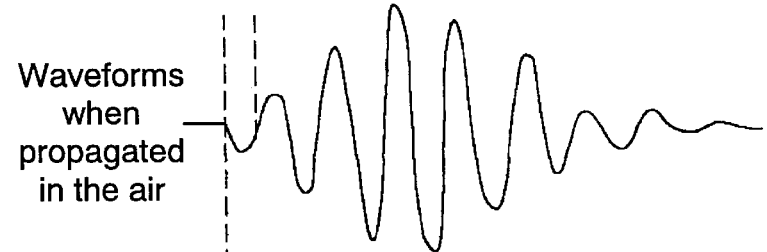
Figure 6D:
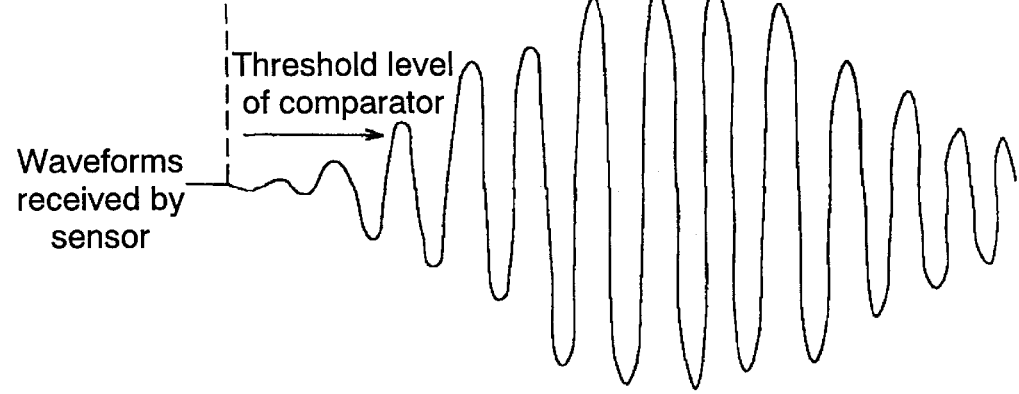
Figure 7:
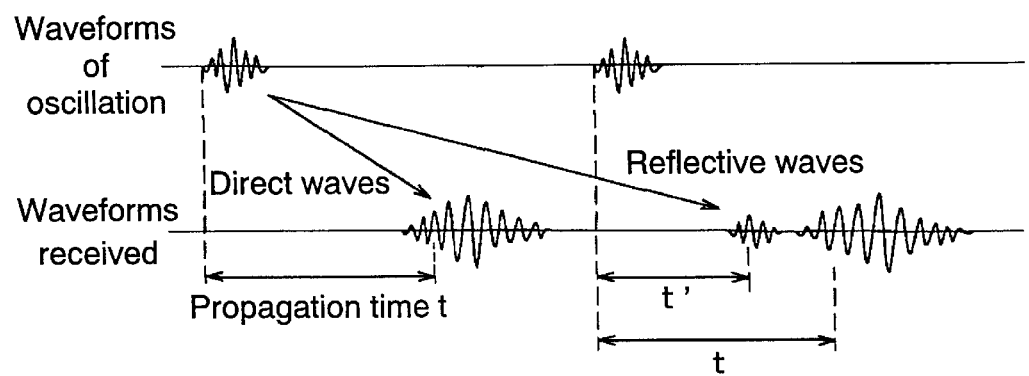
FIG. 7 illustrates how the erroneous performance of a prior art coordinate data entry device is caused by reflective waves.

FIG. 1 is a schematic circuit diagram of an ultrasonic oscillating circuit for a coordinate data entry device in exemplary embodiment 1 of the present invention and FIG. 2A and FIG. 2B illustrate how the ultrasonic oscillating circuit for the coordinate data entry device in exemplary embodiment 1 of the present invention operates. As FIG. 1 shows, the ultrasonic oscillating circuit comprises transistor 1, diode 2 and coil 3 that are connected in series and ultrasonic resonator 4 connected in parallel with coil 3, thereby constituting a resonant circuit. The overall structure of the coordinate data entry device is the same as illustrated in FIG. 4.

As FIG. 2A shows, when input 1 in the form of a pulse is fed to transistor 1, transistor 1 is turned on, thereby causing an electric current to flow in coil 3 and diode 2. The electric current flowing in coil 3 and diode 2 is expressed as i D1. Electric current i D1 starts to increase with the application of the pulse of input 1 and reaches the maximum value (i peak1) at the time when the application of the pulse comes to an end. When the application of the pulse of input 1 is terminated, transistor 1 and diode 2 are turned off and resonance between ultrasonic resonator 4 and coil 3 is started. At this time, the value of i D1 referred to as the resonance start current becomes i peak 1 and a damped oscillation voltage (the maximum value is V peak1) designated as output 1 is applied to ultrasonic resonator 4, thereby causing an ultrasonic oscillation to take place.

As FIG. 2B shows, when input 2 in the form of a pulse, the width of which is one half of the width of input 1, is applied, the maximum value of the current (i peak2) flowing in coil 3 and diode 2 becomes one half of i peak1 since the increasing rate of the electric current i D2 flowing in coil 3 and diode 2 is the same as i D1 and the period of time, during which the electric current i D2 is applied, is halved. Accordingly, the resonance start current is halved, thereby reducing the maximum voltage (V peak 2) applied to ultrasonic resonator 4 to one half of the aforementioned V peak1 with a resulting reduction of the ultrasonic output level by 50%.

As described in above, according to exemplary embodiment 1 of the present invention, the magnitude of resonance start current can be controlled by adjusting the width of input pulse, thereby allowing the ultrasonic output level to be controlled. Therefore, even when there are variations in performance on the part of a power supply and a coil and variations in the output of an ultrasonic resonator, the ultrasonic output is allowed to be kept constant by making the pulse width variable.

(Exemplary Embodiment 2)

FIG. 3A, FIG. 3B, FIG. 3C and FIG. 3D illustrate how an ultrasonic oscillating circuit for a coordinate data entry device in exemplary embodiment 2 of the present invention operates. The schematic circuit diagram of the ultrasonic oscillating circuit for the coordinate data entry device is the same as FIG. 1.

Figure 3A:
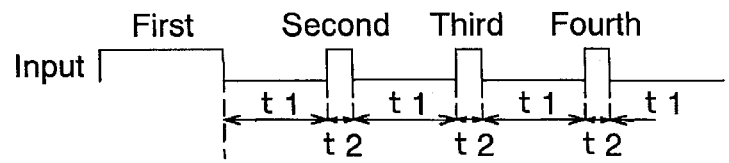
FIG. 3A, FIG. 3B, FIG. 3C and FIG. 3D illustrates how an ultrasonic oscillating circuit for a coordinate data entry device in exemplary embodiment 2 of the present invention operates, respectively.
Figure 3B:
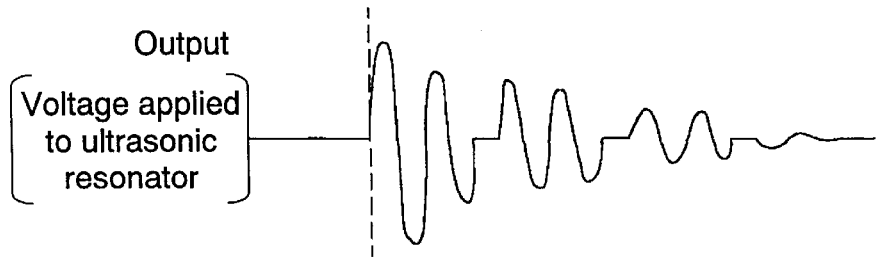

The input pulse as FIG. 3A shows comprises a first pulse to determine the resonance start current, and second, third and fourth pulses, each having the pulse width (t2) corresponding to half a period of the resonance frequency generated by ultrasonic resonator 4 and coil 3.

In addition, the second, the third and the fourth pulses are fed as an input at an interval (t1) corresponding to two periods of the resonance frequency, respectively.

Next, a description is given to how the ultrasonic oscillating circuit operates. After the first pulse is fed to the ultrasonic oscillating circuit, a resonance voltage is applied to ultrasonic resonator 4 in the same manner as described before. However, after a lapse of two periods, transistor 1 is turned on again by the second pulses, thereby causing the resonance current to flow in diode 2 and transistor 1 to end up with stopping the resonance. After a lapse of another half a period, transistor 1 is turned off, thereby causing the resonance to start again. Thereafter, the same operational cycles are repeated by the third and the fourth pulses. As a result, a voltage with the phase thereof reversed every two periods is applied to ultrasonic resonator 4. (Refer to FIG. 3B.)

Figure 3C:
Figure 3D:
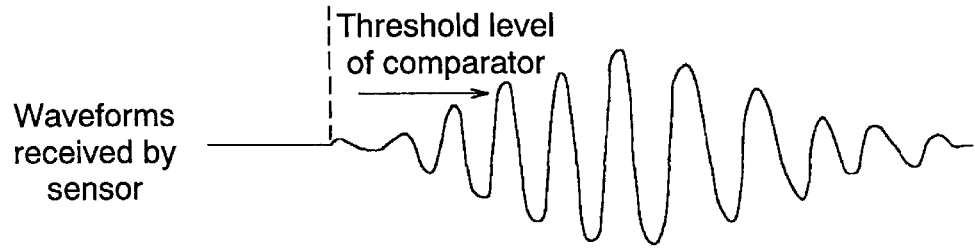

Accordingly, ultrasonic resonator 4 is allowed to be applied with a voltage with the phase thereof reversed every two periods after a resonance is started. Therefore, the ultrasonic waves produced are propagated in the air in such a way as the amplitude increases gradually up to a lapse of two periods like the ordinary operation as FIG. 3C shows. Then, the amplitude declines and also the frequency ends up with deviating from the resonance frequency. When these ultrasonic waves are received by a resonant type ultrasonic sensor, the amplitude shows the same increase as experienced normally up to a lapse of two to three periods as FIG. 3D shows and the amplitude increase at the time of positional detection and thereafter is allowed to be suppressed. As a result, the amplitude of reflective waves is allowed to remain below the threshold level of a comparator, thereby enabling the erroneous performance of positional detection due to reflective waves to be prevented from occurring.

In exemplary embodiment 2, the phase of the voltage applied to ultrasonic resonator 4 is reversed after a lapse of two periods from the start of resonance but the same effect is allowed to be achieved by changing the frequency of the voltage.

As described in above, a coordinate data entry device comprises a plurality of receivers disposed in the vicinity of a board surface and a position indicator to transmit positional signals, at least one of which employs ultrasonic waves, and the receivers receive the positional signals to detect the position of the position indicator on the board surface and to make the coordinate data of the position indicator available for entry. The positional signal employing ultrasonic waves is transmitted at an arbitrary time interval from the position indicator containing an ultrasonic oscillating circuit, in which an ultrasonic resonator and a coil are connected in parallel with each other constituting a resonant circuit, thereby allowing the amplitude of resonance start current to be made variable according to the lapse of time. As a result, even when there are variations in performance with a power supply and a coil and variations in the output of an ultrasonic resonator, the ultrasonic output can be kept constant by making the input pulse width variable. The arrangement for making the input pulse width variable can be achieved readily by the use of CPU or a digital circuit and an ultrasonic output, which is easy to adjust and stabilized in performance, is allowed to be obtained. Therefore, a coordinate data entry device to perform positional detection, which is free of erroneous performance and stabilized in functioning, is allowed to be realized.

In addition, with the coordinate data entry device comprising a plurality of receivers disposed in the vicinity of a board surface and a position indicator to transmit positional signals, at least one of which employs ultrasonic waves and which are received by the receivers for detecting the position of the position indicator on the board surface and making the coordinate data of the position indicator available for entry, the positional signal employing ultrasonic waves is transmitted at an arbitrary time interval and the ultrasonic oscillating circuit is set up so as to have the oscillation frequency switched to a different phase or frequency at an arbitrary time interval after the ultrasonic oscillation is started, thereby changing at some midpoint in time the phase of the resonance voltage applied to the ultrasonic resonator of the ultrasonic oscillating circuit and also allowing the amplitude of undesired ultrasonic waves produced after passing the position for a positional detection to be suppressed and the frequency thereof to be shifted from the resonance frequency of the receiver's ultrasonic sensor. In other words, a sufficient ultrasonic oscillation level needed for the positional detection to be performed by the receivers is made available and also the amplitude of reflective waves at the time of reception thereof can be suppressed. Therefore, erroneous performance in positional detection due to reflective waves can be prevented from occurring, thereby enabling the realization of a coordinate data entry device that makes stabilized positional detection possible.

What is claimed is:

1. A coordinate data entry device comprising:

a plurality of receivers disposed near a board surface; and a position indicator to transmit signals, at least one of which employs ultrasonic waves, to said receivers, thereby detecting a position of said position indicator on said board surface and making a coordinate position of said position indicator available for entry, wherein said signal employing ultrasonic waves is transmitted at an arbitrary time interval, an ultrasonic oscillating circuit generating said signal employing ultrasonic waves comprises a resonant circuit formed of an ultrasonic resonator and a coil, which are connected in parallel with each other, and an amplitude of a start current of said resonant circuit is made variable according to a lapse of time.

2. A coordinate data entry device comprising:

a plurality of receivers disposed near a board surface; and a position indicator to transmit signals, at least one of which employs ultrasonic waves, to said receivers, thereby detecting a position of said position indicator on said board surface and making a coordinate position of said position indicator available for entry, wherein said signal employing ultrasonic waves is transmitted at an arbitrary time interval, an ultrasonic oscillating circuit generating said signal employing ultrasonic waves comprises a resonant circuit formed of an ultrasonic resonator and a coil, which are connected in parallel with each other, and a period of time, during which an electric current flows in said coil, is made variable.

3. The coordinate data entry device according to claim 2, wherein said ultrasonic oscillating circuit comprises said resonant circuit formed of said ultrasonic resonator and coil, which are connected in parallel with each other, and a diode connected in series with said ultrasonic resonant circuit.

4. The coordinate data entry device according to claim 3, wherein an amplitude of a start current of said ultrasonic resonant circuit is made variable by making a period of time, during which an electric current flows in said coil, variable.

5. A coordinate data entry device comprising:

a plurality of receivers disposed near a board surface; and a position indicator to transmit signals, at least one of which employs ultrasonic waves, to said receivers, thereby detecting a position of said position indicator on said board surface and making a coordinate position of said position indicator available for entry, wherein said signal employing ultrasonic waves is transmitted at an arbitrary time interval, and an ultrasonic oscillating circuit transmitting said signal employing ultrasonic waves allows a phase or frequency of said signal employing ultrasonic waves to be switch-selectable at an arbitrary time interval after starting of an ultrasonic oscillation.

6. The coordinate data entry device according to claim 5, wherein said ultrasonic oscillating circuit is revered in phase for every fixed oscillation period.

7. An ultrasonic oscillating circuit comprising:

a resonant circuit for generating a signal employing ultrasonic waves, said resonant circuit including an ultrasonic resonator and a coil coupled in parallel with each other;

a switch coupled to said coil, said switch causing a resonance start current to flow in said coil for at least one of a plurality of time intervals, said resonance start current having an amplitude, wherein the resonant circuit generates the signal when the amplitude of the resonance start current reaches a high value, and wherein the amplitude of the high value of the resonance start current depends upon the length of the at least one of a plurality of time intervals.

* * * * *